United States Patent [19]

Horst et al.

[11] 4,279,716

[45] Jul. 21, 1981

[54] ODOR CONTROL SYSTEM

[75] Inventors: Ronald A. Horst; Ross R. Hedrich, both of Newport Beach, Calif.

[73] Assignee: Odor Control Systems, Inc., Newport Beach, Calif.

[21] Appl. No.: 124,783

[22] Filed: Feb. 26, 1980

[51] Int. Cl.³ .............................................. C25B 9/00
[52] U.S. Cl. .................................................. 204/149
[58] Field of Search ....................... 204/149, 150–152, 204/95

[56] References Cited

U.S. PATENT DOCUMENTS

| | | | |
|---|---|---|---|
| 1,012,808 | 12/1911 | Bull | 204/149 |
| 3,553,088 | 1/1971 | Grotheer et al. | 204/95 |
| 3,568,215 | 3/1971 | Riedel et al. | 4/10 |
| 3,935,092 | 1/1976 | Bizot et al. | 204/149 |
| 3,939,499 | 2/1976 | Roberts | 204/149 |
| 3,975,256 | 8/1976 | Johnson et al. | 204/149 |

FOREIGN PATENT DOCUMENTS 146126  7/1949  Australia .................................. 204/149

Primary Examiner—R. L. Andrews
Attorney, Agent, or Firm—Harvey C. Nienow

[57] ABSTRACT

An odor control system for a holding tank of liquid and solid excrement wherein one or more pairs of electrodes formed of highly conductive material and generally rectangular in shape are mounted on opposite sides of the holding tank. A source of electrical power is connected in circuit with such electrodes through a timing device which automatically connects said electrodes to said source for a predetermined length of time and then disconnects the same for a predetermined length of time.

3 Claims, 3 Drawing Figures

U.S. Patent  Jul. 21, 1981  4,279,716
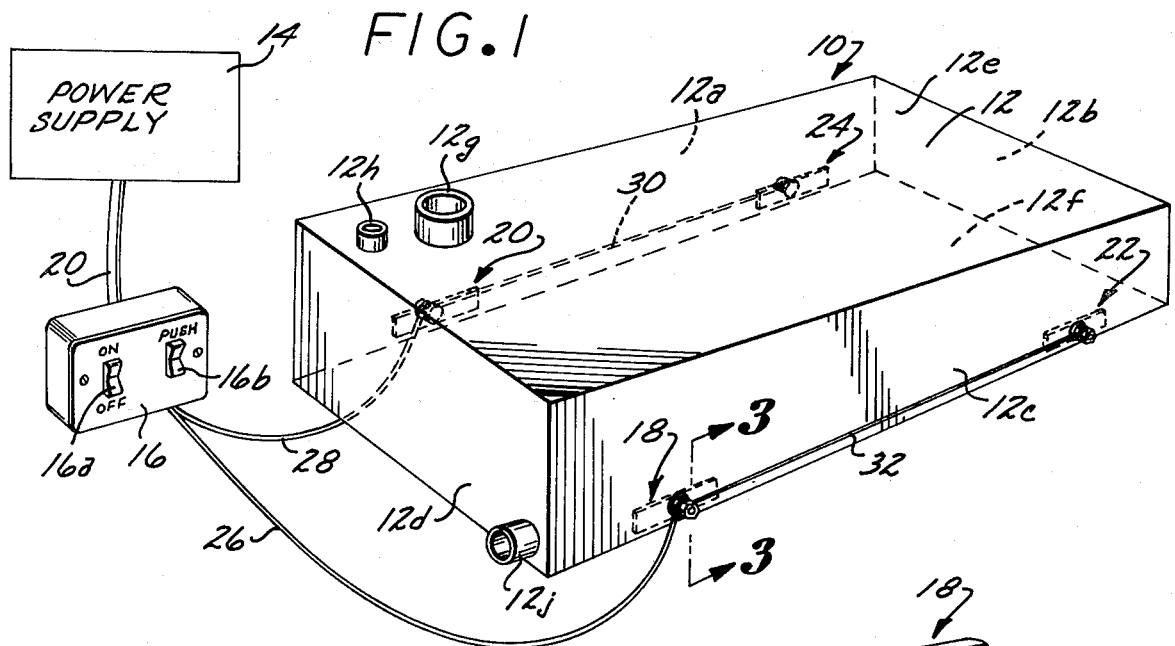
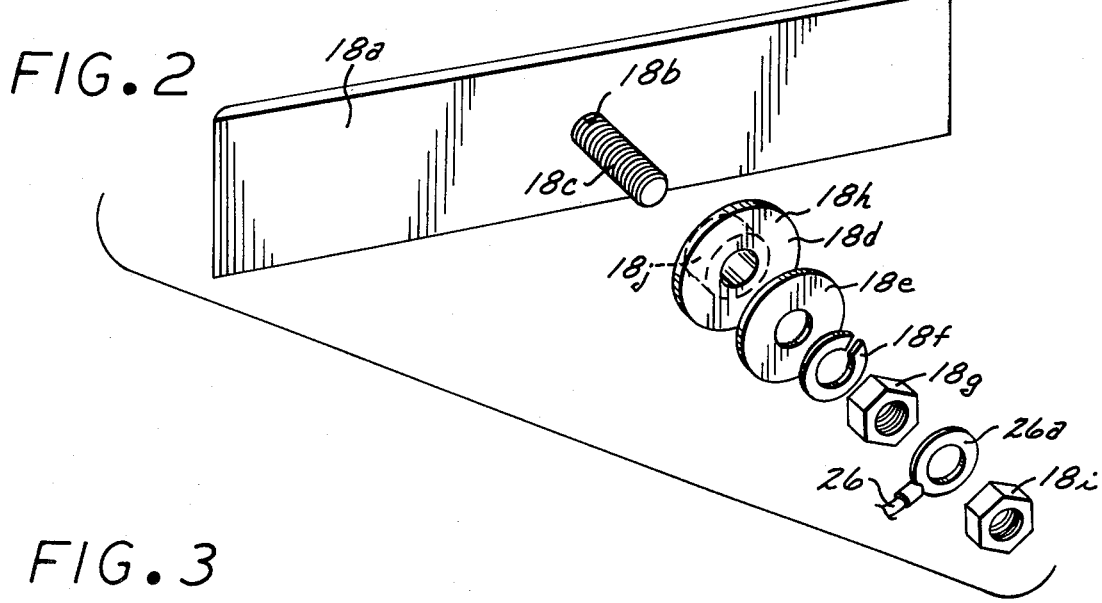
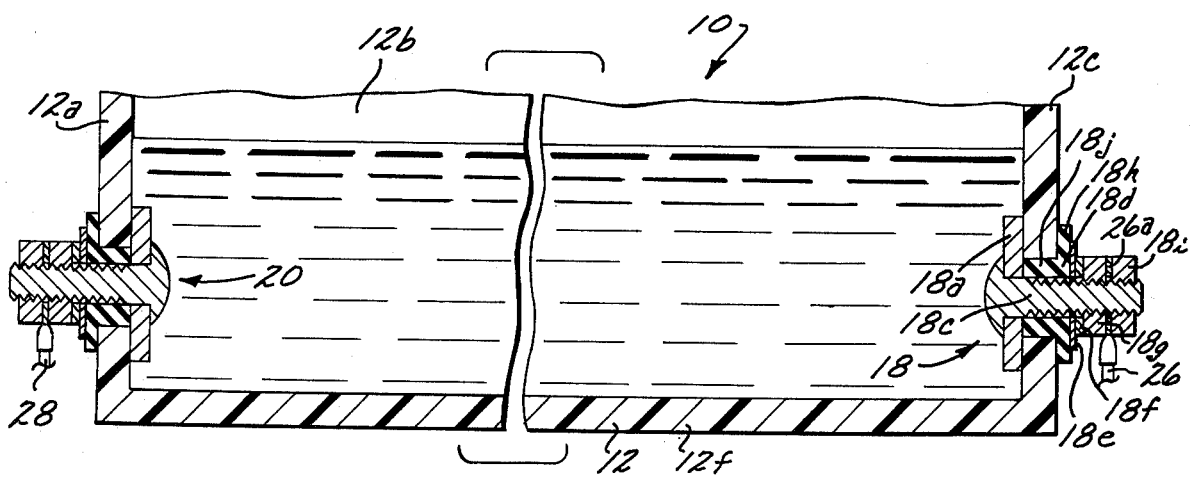

ODOR CONTROL SYSTEM

The present invention relates generally to odor control systems for holding tanks and the like, and more particularly to such systems which are electrically powered.

What with the high mobility of most people today, particularly people residing in the United States, temporary and portable bathrooms are not unusual. For instance, many camping and recreational facilities are provided with temporary toilet units to accomodate relatively large numbers of people for a short period of time. Also, recreational vehicles of every type and description are relatively commonplace today, many of which have self-contained bathroom facilities, including toilets and showers.

Frequently, such self-contained toilets and showers carry objectional odors which emanate from holding tanks beneath the vehicle. In like manner, many, if not all, temporary toilet facilities erected at camping and sporting locations also contain holding tanks from which objectionable odors emanate.

Various chemicals have been used in the past in an attempt to counteract such objectionable odors, but such materials have been ineffective or have provided such an obnoxious odor, that the holding tank odors have not been adequately eliminated.

It is an object of the present invention to provide an odor control system which is automatically effective to eliminate odors emanating from contents of a holding tank.

Another object of the present invention is to provide an odor control system as characterized above which is capable of being powered by a typical source of power such as a 12 volt batter or ordinary alternating current power.

A still further object of the present invention is to provide an odor control system as characterized above which can be incorporated in new toilet facilities at the time of manufacture, or can be used to modify existing facilities.

Another still further object of the present invention is to provide an odor control system as characterized above wherein automatic timing means is employed to automatically turn the system on and off so that the odor elimination function takes place automatically without the need for any manual manipulation or operation.

An even further object of the present invention is to provide an odor control system as characterized above which can be installed and operated without the need for any special skills or training on the part of the installer or owner of the equipment.

An even still further object of the present invention is to provide an odor control system as characterized above which is simple and inexpensive to manufacture and which is rugged and dependable in operation.

The novel features which we consider characteristic of our invention are set forth with particularity in the appended claims. The invention itself, however, both as to its organization and mode of operation, together with additional objects and advantages thereof, will best be understood from the following description of specific embodiments when read in connection with the accompanying drawings, in which:

FIG. 1 is a perspective view of an odor control system according to the present invention.

FIG. 2 is an exploded perspective view of one of the electrodes of the subject system, and FIG. 3 is a fragmentary sectional view taken substantially along line 3—3 of FIG. 1 of the drawings.

Like reference characters indicate corresponding parts throughout the several views of the drawings.

Referring to FIG. 1 of the drawings, there is shown therein an odor control system 10 according to the present invention. It comprises a holding tank or other type of waste reservoir 12, a source of power 14 and a regulator-timer 16.

Holding tank 12 may take substantially any desired form or design, and usually is adapted to be connected to the underside of a toilet unit (not shown) or other waste producing device. Tank 12 is provided with four sidewalls 12a, 12b, 12c and 12d, as well as a top wall 12e and a bottom wall 12f. Although tank 12 can be formed of any appropriate material, today such holding tanks are usually formed of plastic material which is impervious to shock and extraneous forces, and is relatively inert to waste products of all types and kinds.

An inlet 12g is provided in any appropriate location in the top wall 12e for connection to the underside of a toilet unit as mentioned above. Outlet 12g is usually bonded to the top wall 12e about an appropriate opening formed in such top wall.

A vent 12h is also provided in the top wall 12d to vent the tank 12 to atmosphere. Also, an outlet 12j is provided in wall 12d. In this regard, outlet 12j is usually bonded to appropriate valve means (not shown) to enable such tank to be systematically and conveniently drained and flushed.

Mounted in the opposite side walls 12a and 12c of tank 12 are four electrodes 18, 20, 22 and 24. As will be understood by those persons skilled in the art, the electrodes 18 and 20 constitute a pair, and electrodes 22 and 24 constitute a second pair. Any appropriate number of pairs of electrodes are usable within the context of the present invention, and it is further contemplated that even a single pair of electrodes could be used satisfactorily. Additional pairs of electrodes are desirable in order to handle an increased volume of odor-producing material with a minimum amount of electrical power applied to the odor control system, as will hereinafter become more apparent.

As shown most particularly in FIG. 2 with respect to electrode 18, each such electrode is formed of a rectangular piece of electrically conductive material providing an electrode plate 18a. The electrode plates are formed of material such as lead, copper, nickle plated steel or steel plated with a carbon compound. Typically, each electrode plate 18a is 6 inches long, 1 inch wide and approximately $\frac{1}{8}$ inch in thickness.

As shown with respect to plate 18a each plate is formed with a generally centrally located through opening 18b for receiving a bolt 18c as shown most particularly in FIGS. 2 & 3 of the drawings. It is preferable that bolt 18c is soldered to the electrode plate 18a to insure maximum electrical conductivity therebetween.

To properly mount electrode 18 within tank 12 in close proximity to the bottom wall 12f, an insulating washer 18d, a flat washer 18e, a lock washer 18f and a nut 18g are utilized as shown in FIGS. 2 & 3. Insulating washer 18d is formed with a flat portion 18h and an extension 18j, the latter of which fits within an opening in sidewall 12c of tank as shown most particularly in FIG. 3 of the drawings. Thus, by tightening nut 18g on bolt 18c with the various washers 18d, 18e and 18f in place, the electrode plate 18a is firmly held in place.

It should be well understood that the electrodes 18, 20, 22 & 24 are identical in construction and thus are mounted in the respective sidewalls in the same manner as described above.

It is contemplated that the source of electrical power 14 may be any appropriate and available power. That is, such source 14 might be a 12 volt battery, or it might be a source of alternating current electrical power and a rectifier to provide direct current power of the proper voltage.

Connected in circuit with the source of power 14 as by lead wire 20, is the regulator-timer 16. Device 16 has several subassemblies, one of which is a regulator (not shown in detail) for maintaining the 12 volt potential substantially constant to insure proper functioning of the subject system. The other subassembly is the timing unit which is electrically operated to connect and disconnect electrical power to the various above described electrodes, as will hereinafter become more apparent.

An on-off switch 16a is provided on the regulator-timer 16 to control the on-off condition of the entire system. That is, if the holding tank 12 is not being used, the system can remain unenergized. To permit manual control over the operation of the system, a momentary switch 16b is provided by the timer. That is, in the event it is desired to utilize the odor control system during the disconnect portion of the timing cycle, as for instance if the tank 12 has an unusually large amount of waste material, it is a simple matter to actuate switch 16b to instigate a new energization or connect portion of the timing cycle.

Lead wires 26 and 28 are provided to conduct the electrical current from the regulator-timer 16 to the electrodes 18 and 20 respectively. A lead wire 30 interconnects electrodes 20 and 24 and a lead wire 32 interconnects electrodes 18 and 22. To facilitate such connections, as shown most particularly in FIGS. 2 and 3 of the drawings, an additional nut as shown as 18j with respect to electrode 18, is provided on the bolt 18c to firmly grip the appropriate ends of the lead wires, as shown with respect to eyelet 26a with respect to electrode 18.

Thus the electrodes of each pair are connected to opposite poles or terminals of the source of power 14 whenever the timing cycle so provides. That is, the electrodes 18 and 20, as determined by the timer, are connected to opposite poles so that a difference in electrical potential exists across the waste material in tank 10 between such electrodes. It has been found that an effective and appropriate cycle might be to have the system energized for approximately 20 minutes. If need be, a small amount of sodium chloride can be added to the waste material in tank 12 to increase the conductivity of such material to facilitate the odor eliminating process.

It is thus seen that the present invention provides an odor control system which is automatically operable to eliminate odors without the need for any manual intervention of any kind. However, when it is desired to render the system inoperative, suitable manually operable means can be used for that purpose.

Although we have shown and described certain specific embodiments of our invention, we are well aware that many modifications thereof are possible. The invention, therefore, is not to be restricted except insofar as is necessitated by the prior art and by the spirit of the appended claims.

I claim:

1. An odor control system for a tank for holding solid and liquid excrement comprising in combination,
    a tank formed with a bottom wall and at least two opposite sidewalls,
    at least one pair of electrodes each of which is generally rectangular in shape and individually positioned in a separate one of said sidewalls with a longer dimension thereof parallel to and in close proximity to said bottom wall, said electrodes being mounted in substantially parallel relation in opposed alignment,
    a source of direct current electrical power for connection to said electrodes,
    timing means operatively interposed between said source and said electrodes to automatically connect the source to said electrodes and to automatically disconnect the same following a predetermined interval of time,
    and manual override means for said timing means whereby said electrodes can be connected to said source irrespective of said automatic operation.

2. An odor control system for a tank for holding solid and liquid excrement according to claim 1 wherein said electrodes are formed of electrically conductive material for conducting a relatively small amount of electrical current through a relatively large amount of material in said tank.

3. An odor control system for a tank for holding solid and liquid excrement according to claim 2 wherein each of said electrodes is formed with combination mounting-terminal means for mounting the respective electrode to its tank sidewall and connecting the same in circuit with said source of electrical power.

* * * * *